United States Patent
Sugimura et al.

(10) Patent No.: US 8,780,405 B2
(45) Date of Patent: Jul. 15, 2014

(54) PRINTER AND NON-TRANSITORY COMPUTER-READABLE STORAGE MEDIUM STORING PRINTING CONTROL PROGRAM

(71) Applicant: Brother Kogyo Kabushiki Kaisha, Nagoya (JP)

(72) Inventors: Yoshihiko Sugimura, Nagoya (JP); Satoru Moriyama, Iwakura (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/763,749

(22) Filed: Feb. 11, 2013

(65) Prior Publication Data
US 2013/0258356 A1 Oct. 3, 2013

(30) Foreign Application Priority Data
Mar. 30, 2012 (JP) .................................. 2012-082571

(51) Int. Cl.
*G06F 15/00* (2006.01)
*G06F 3/12* (2006.01)
*G06K 1/00* (2006.01)

(52) U.S. Cl.
USPC ............................................ 358/1.5; 358/517

(58) Field of Classification Search
USPC .............................. 358/1.5, 1.1, 1.9, 518, 517
See application file for complete search history.

(56) References Cited

U.S. PATENT DOCUMENTS

| 2004/0041895 | A1* | 3/2004 | Tajima | ........................ 347/116 |
| 2007/0140710 | A1* | 6/2007 | Okano | ........................... 399/13 |
| 2011/0211895 | A1 | 9/2011 | Inabu | |

FOREIGN PATENT DOCUMENTS

| JP | H2-137835 | 5/1990 |
| JP | H7-309039 | 11/1995 |

OTHER PUBLICATIONS

Extended European Search Report issued in European Application No. 13156038.5 on Aug. 8, 2013.

* cited by examiner

*Primary Examiner* — Douglas Tran
(74) *Attorney, Agent, or Firm* — McCarter & English, LLP

(57) ABSTRACT

A printer includes a printing device, a transport device that transports the printing medium, an optical sensor that outputs a specified output value, based on light that is reflected from the reverse face of the printing medium, a first determination portion that determines whether a first detection object color has been detected, based on the output value, a second declaration portion that declares that the mark has been detected in a case where, after a first declaration portion that, in a case where the number of times that the first determination portion has consecutively determined that the first detection object color has been detected, declares that the first detection object color is continuous over a specified width, the number of times that a second determination portion has consecutively determined that the second detection object color has been detected, based on the output value.

14 Claims, 16 Drawing Sheets

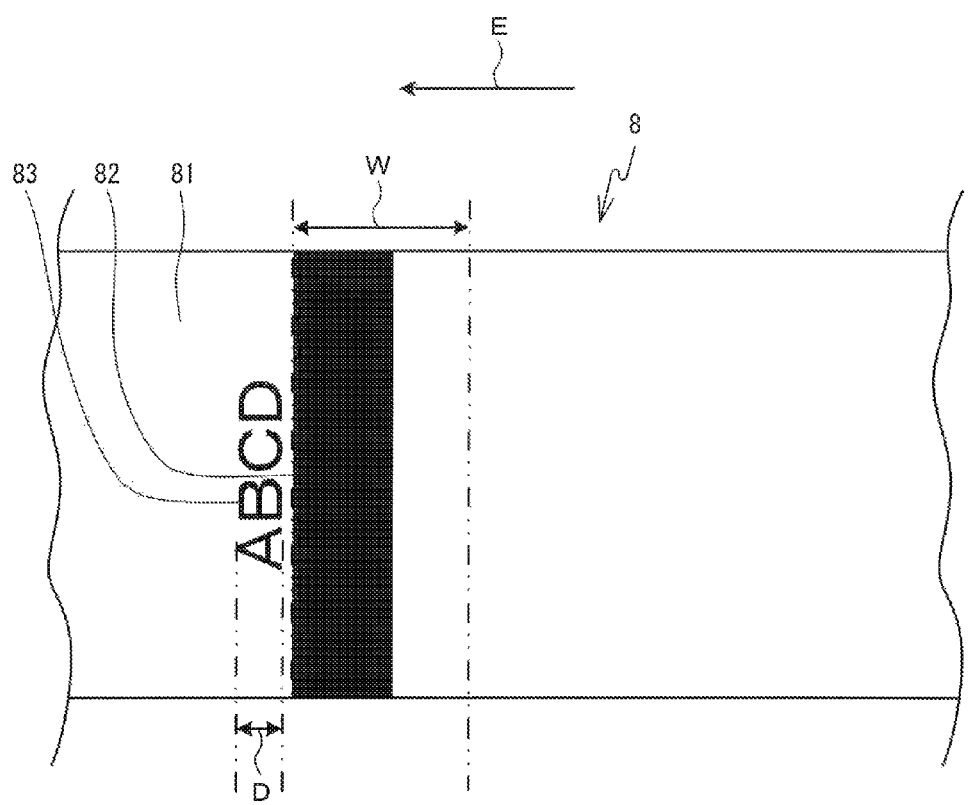

PRINTER AND NON-TRANSITORY COMPUTER-READABLE STORAGE MEDIUM STORING PRINTING CONTROL PROGRAM

CROSS-REFERENCE TO RELATED APPLICATION

This Application claims priority from JP2012-082571, filed Mar. 30, 2012, the content of which is hereby incorporated by reference in its entirety.

BACKGROUND

The present disclosure relates to a printer that detects a mark that is printed on a reverse face of a printing medium that is continuous in a feed direction, determines the position of a printing start position, and performs printing, and to a non-transitory computer-readable storage medium that stores a printing control program.

A printer is known that prints on a continuous-form paper that is made up of a plurality of forms, such as tickets, receipts, or the like, in series. The printer accurately determines the position of a printing start position for a single form, in relation to a printing position of a print head, by detecting a black mark that is printed on the reverse face of the continuous-form paper. In the printer, a reflecting-type optical sensor projects light onto the reverse face of the continuous-form paper and detects reflected light that is reflected from the reverse face of the continuous-form paper. The printer detects the black mark that is printed on the reverse face of the continuous-form paper based on changes in the level of the reflected light that is detected.

However, the printer that is described above determines that the mark has been detected when the level of the light that is detected by the reflecting-type optical sensor has changed, so in a case where characters, symbols, or the like other than the mark are printed on the reverse face of the continuous-form paper, it sometimes happens that those characters, symbols, or the like are detected as the mark. With the printer that is described above, cases occur in which the printing cannot be done in the correct position on the printing medium if the mark cannot be detected correctly.

SUMMARY

The present disclosure provides a printer that accurately detects a mark that is printed on the reverse face of the continuous-form paper for determining the printing start position, and also provides a non-transitory computer-readable storage medium that stores a printing control program.

A printer according to a first embodiment of the present disclosure includes a printing device, a transport device, a control portion, an optical sensor, a width information storage portion, a threshold value setting portion, a first determination portion, a first declaration portion, a second determination portion, and a second declaration portion. The printing device prints on a surface of a printing medium. The transport device transports the printing medium. The control portion controls the transporting of the printing medium by the transport device and the printing by the printing device, based on detection of a mark that is printed in advance on a reverse face of the printing medium. The optical sensor outputs a specified output value, based on light that is reflected from the reverse face of the printing medium. The width information storage portion stores width information that indicates a width of the mark in the transport direction of the printing medium. The threshold value setting portion sets a first threshold value for making a determination, based on the width information that is stored in the width information storage portion, as to whether the mark has been detected. The first determination portion determines whether a first detection object color has been detected, based on the output value from the optical sensor. In a case where the number of times that the first determination portion has consecutively determined that the first detection object color has been detected is not less than the first threshold value, the first declaration portion declares that the first detection object color is continuous over a specified width in the transport direction of the printing medium. The second determination portion determines whether a second detection object color that is different from the first detection object color has been detected, based on the output value from the optical sensor. The second declaration portion declares that the mark has been detected in a case where, after the first declaration portion has declared that the first detection object color is continuous over the specified width in the transport direction of the printing medium, the number of times that the second determination portion has consecutively determined that the second detection object color has been detected is not less than a specified second threshold value.

According to a second embodiment of the present disclosure, a non-transitory computer-readable storage medium that stores a printing control program causes a printer that is provided with a printing device that prints on a printing medium, a transport device that transports the printing medium, and an optical sensor that outputs a specified output value based on reflected light to perform processing that is hereinafter described. Width information is stored that indicates a width in the transport direction of the printing medium of a mark that is printed in advance on a reverse face of the printing medium. A first threshold value is set for making a determination, based on the stored width information, as to whether the mark has been detected. A determination is made as to whether a first detection object color has been detected, based on the output value from the optical sensor, which is based on light that is reflected from the reverse face of the printing medium. In a case where the number of times that it has been consecutively determined that the first detection object color has been detected is not less than the first threshold value, a declaration is made that the first detection object color is continuous over a specified width in the transport direction of the printing medium. A determination is made as to whether a second detection object color that is different from the first detection object color has been detected, based on the output value from the optical sensor. A declaration is made that the mark has been detected in a case where, after it has been declared that the first detection object color is continuous over the specified width in the transport direction of the printing medium, the number of times that it has been consecutively determined that the second detection object color has been detected is not less than a specified second threshold value. The transport device and the printing device are controlled based on the detection of the mark.

BRIEF DESCRIPTION OF THE DRAWINGS

Embodiments of the disclosure will be described.

FIG. 16 is a figure of the reverse face of the heat-sensitive tape 8, illustrating a principle by which the fourth computation processing determines the threshold value T.

DETAILED DESCRIPTION OF THE EXEMPLARY EMBODIMENTS

Figure 1:
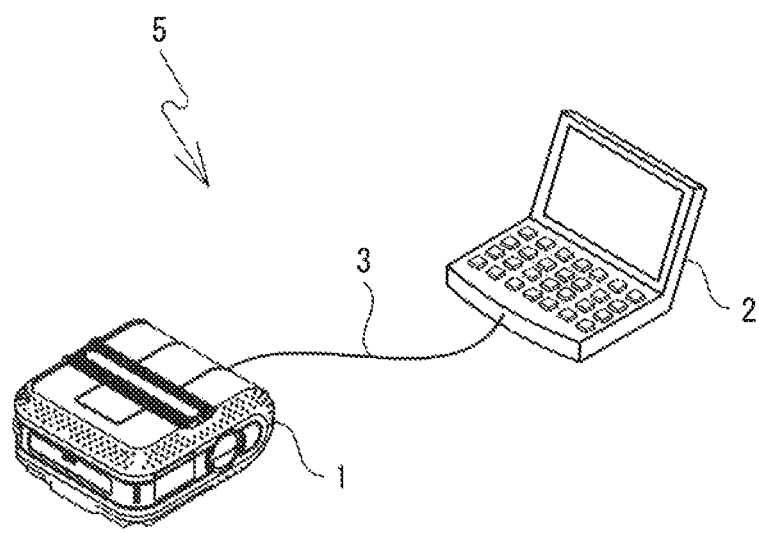
FIG. 1 is a figure that shows an overview of a printing system 5.

Hereinafter, an embodiment of the present disclosure will be explained with reference to the drawings. The drawings are used for explaining technical features that the present disclosure can use. Device configurations, flowcharts for various types of processing, and the like that are shown in the drawings are simply explanatory examples and do not limit the present disclosure to what is shown in the drawings.

An overview of a printing system 5 will be explained with reference to FIG. 1. The printing system 5 is provided with a printer 1 and an external terminal 2 (for example, a personal computer). The printer 1 and the external terminal 2 are connected by a USB (registered trademark) cable 3. The printer 1 creates a label by printing text characters, graphics, and the like on a heat-sensitive tape 8 (refer to FIG. 6 and the like) that is a printing medium, then cutting off the portion of the heat-sensitive tape 8 on which the text characters, graphics, and the like have been printed. The printer 1 is one of a tape printer and a label printer that creates labels based on printing data that have been received from the external terminal 2. The external terminal 2 is a general-purpose personal computer (PC). The external terminal 2 creates the printing data that are required in a case where the printer 1 will create the labels. A user can edit the printing data by using a keyboard and a mouse of the external terminal 2.

The configuration of the printer 1 will be explained with reference to FIGS. 2 to 4. The lower right, the upper left, the upper right, the lower left, the upward direction, and the downward direction in FIG. 2 are respectively defined as the right, the left, the rear, the front, the top, and the bottom of the printer 1.

Figure 2:
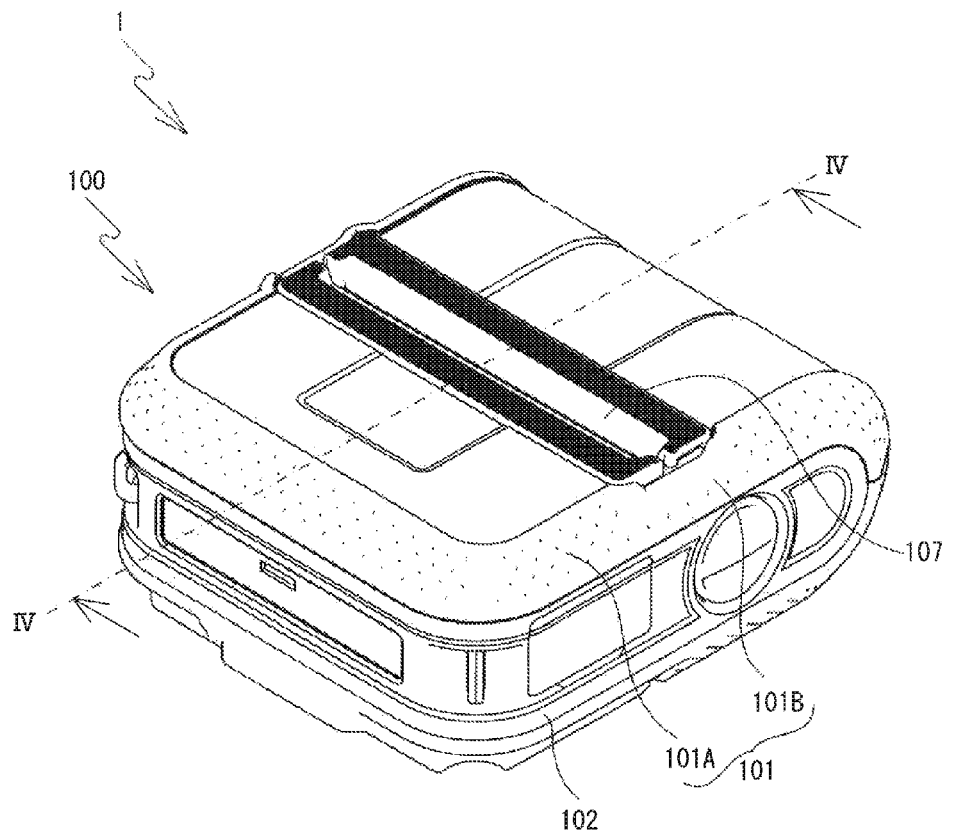
FIG. 2 is an oblique view of a printer 1.

As shown in FIG. 2, the printer 1 is provided with a housing 100. The shape of the housing 100 is approximately a box shape. The housing 100 is provided with a top cover 101 on its top side. The housing 100 is provided with a bottom cover 102 on its bottom side. The top cover 101 is provided with a fixed portion 101A and a lid 101B. The fixed portion 101A is the front portion of the top cover 101. The lid 101B is the rear portion of the top cover 101.

Figure 3:
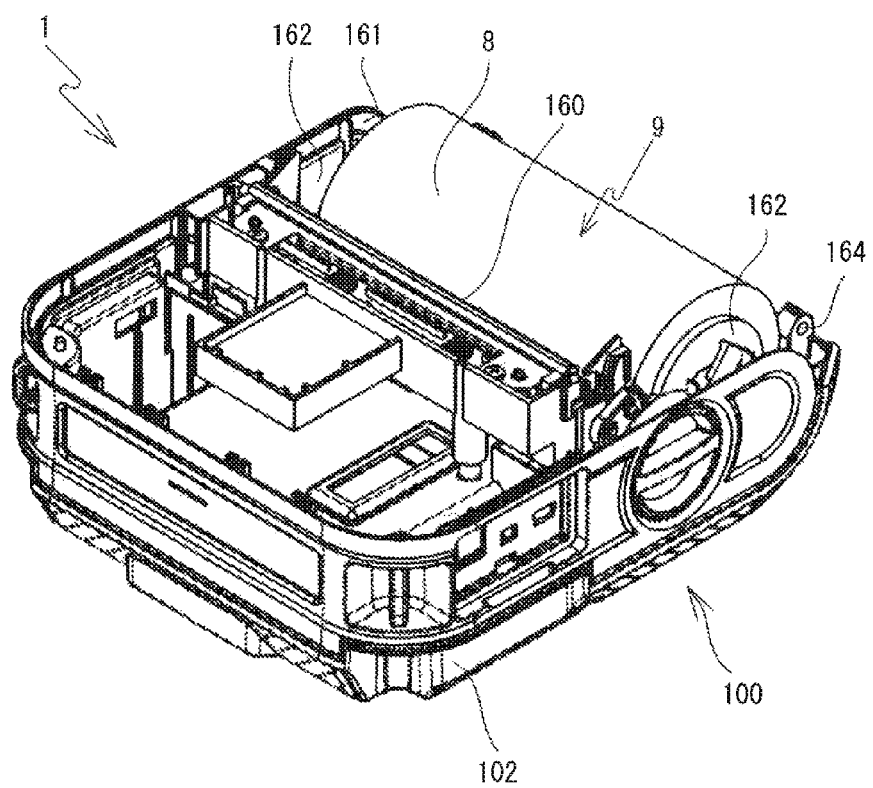
FIG. 3 is an oblique view of the printer 1 in a state in which a top cover 101 has been removed.

As shown in FIG. 3, the housing 100 is provided with a roll containing portion 161 underneath the lid 101B (refer to FIG. 2). The roll containing portion 161 contains a roll 9, around which the heat-sensitive tape 8 is wound. Supporting members 162 are attached to both ends of the roll 9. The supporting members 162 support the roll 9 such that it can rotate about its axis. This structure makes it possible for the printer 1 to supply the heat-sensitive tape 8 continuously from the roll containing portion 161. A hinge 164 supports the rear edge of the lid 101B such that the lid 101B can rotate about its axis. The lid 101B is opened and closed by swinging its front edge up and down around the rear edge as its axis. With the lid 101B in the open state, the roll containing portion 161 is exposed. The user can therefore easily perform replacement of the roll 9.

Figure 4:
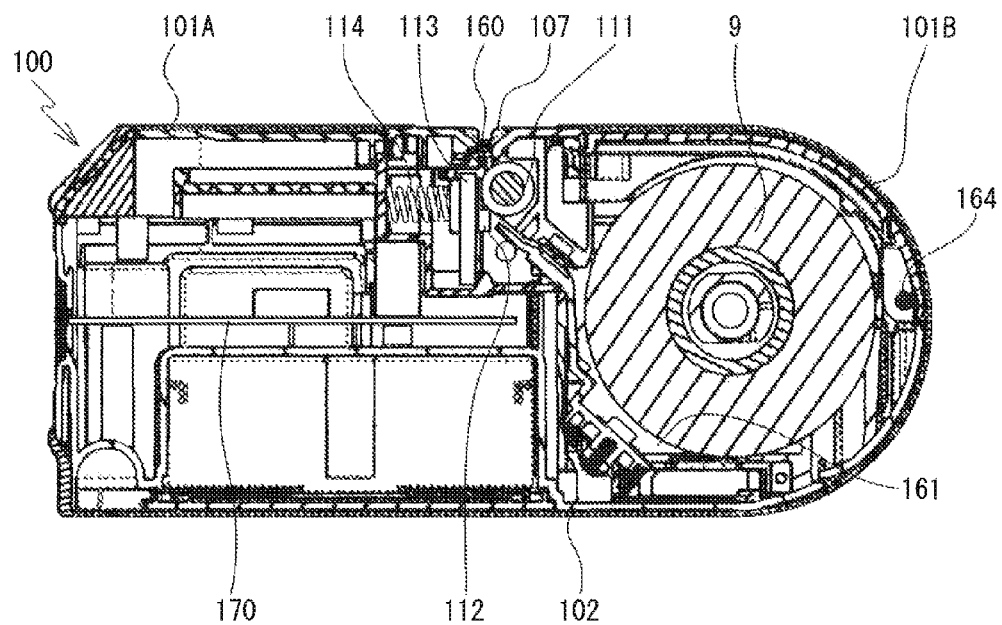
FIG. 4 is a sectional view in the direction of a line IV-IV in FIG. 2.

As shown in FIG. 4, the housing 100 is provided with a discharge outlet 107 between the fixed portion 101A and the lid 101B, approximately in the center of the top cover 101 (refer to FIG. 2) in the front-rear direction. The printed portion of the heat-sensitive tape 8 passes from the inside to the outside of the housing 100 through the discharge outlet 107. Using this structure, the printer 1 discharges the heat-sensitive tape 8 to the outside from the inside of the housing 100. The housing 100 rotatably supports a platen roller 111 at the front edge of the lid 101B. A tape feed motor 18 (refer to FIG. 5) that is provided inside the housing 100 is connected to the platen roller 111 through a gear train (not shown in the drawings). A CPU 11 (refer to FIG. 5) on a control board 170 that is provided in the front portion of the interior of the housing 100 controls the operation of the tape feed motor 18. The rotational driving force of the tape feed motor 18 is transmitted to the platen roller 111, and the platen roller 111 rotates.

A thermal head 112, a fixed plate 113, and a spring 114 are provided below the rear edge of the fixed portion 101A. The fixed plate 113 is provided in front of the platen roller 111. The fixed plate 113 extends to the left and the right in a state in which its faces are oriented in the front-rear direction. The thermal head 112 is provided on the rear face of the fixed plate 113. The thermal head 112 extends in the left-right direction. The thermal head 112 has a structure in which a plurality of heating elements for one line's worth of an image that is formed on the heat-sensitive tape 8 are lined up in the left-right direction. The heating elements of the thermal head 112 generate heat by the passing of an electric current through them. The spring 114 energizes the fixed plate 113 toward the rear.

A cutting blade 160 is provided above the thermal line head 112. The cutting blade 160 extends along the discharge outlet 107. The user can cut the heat-sensitive tape 8 manually by pulling the heat-sensitive tape 8 that has been discharged from the discharge outlet 107 toward the front and pressing it against the cutting blade 160.

The process up to the point when a label is created will be explained. The heat-sensitive tape 8 that has been pulled from the roll 9 that is contained in the roll containing portion 161 is inserted between the platen roller 111 and the thermal line head 112 from the bottom toward the top. The spring 114 energizes the fixed plate 113 toward the rear. The thermal head 112 presses the heat-sensitive tape 8 against the platen roller 111 with a specified force. The heat-sensitive tape 8 is fed until an optical sensor 22 (refer to FIG. 5) detects a black mark 82 (refer to FIG. 6) that is printed on the reverse face of the heat-sensitive tape 8. When the optical sensor 22 detects the mark 82, the heat-sensitive tape 8 is fed to a specified printing start position, and the heating elements of the thermal head 112 generate heat. Images of pixels are formed on the heat-sensitive tape 8 that correspond to the heating elements that have generated heat, such that one line's worth of the image is printed. At the same time, the rotating of the platen roller 111 in conjunction with the turning of the drive motor 18 causes the heat-sensitive tape 8 to be fed out sequentially from the roll 9 and to be transported upward from below. The processing that is described above causes images to be formed repeatedly on the heat-sensitive tape 8, one line at a time, until text characters and graphics are ultimately printed.

After the printing, the printed heat-sensitive tape 8 is discharged to the outside of the housing 100 from the discharge outlet 107, which is on the downstream side of the platen roller 111 and the thermal head 112 in the transport direction. The discharged heat-sensitive tape 8 is cut by the cutting blade 160 that is provided along the discharge outlet 107. The label is created by the process that is described above. Note that, hereinafter, the left-right direction, which is the direction in which the plurality of the heating elements are lined up in the thermal head 112, will also be called a main scanning direction, and the direction in which the heat-sensitive tape 8 is transported will also be called an auxiliary scanning direction.

Figure 5:
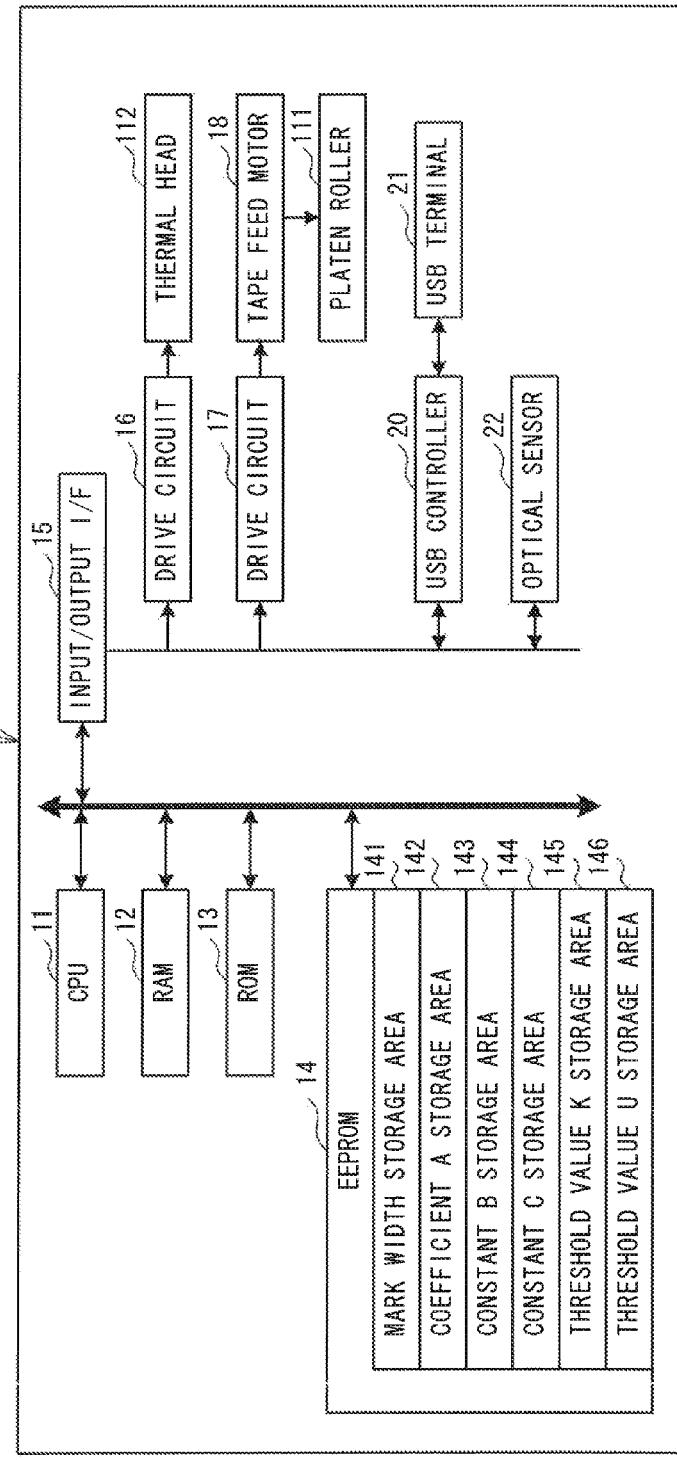
FIG. 5 is a block diagram that shows an electrical configuration of the printer 1.

An electrical configuration of the printer 1 will be explained with reference to FIG. 5. The printer 1 is provided with the CPU 11, a RAM 12, a ROM 13 an EEPROM (registered trademark) 14, an input/output interface (hereinafter called an input/output I/F) 15, a drive circuit 16, a drive circuit 17, the tape feed motor 18, the thermal head 112, the platen roller 111, a USB controller 20, a USB terminal 21, and the optical sensor 22. The CPU 11, the RAM 12, the ROM 13, the EEPROM 14, the input/output I/F 15, the drive circuits 16, 17, and the USB controller 20 are mounted on the control board 170 (refer to FIG. 4). The optical sensor 22 is a reflecting-type optical sensor.

The CPU 11 performs overall control of the printer 1. A control program and the like are stored in the ROM 13. The EEPROM 14 is a rewriteable non-volatile storage element. The printing data that are received from the external terminal 2 are temporarily stored in the RAM 12. Various types of flags, such as a black detection flag (described later) and the like, are also stored in the RAM 12. The EEPROM 14 includes a mark width storage area 141, a coefficient A storage area 142, a constant B storage area 143, a constant C storage area 144, a threshold value K storage area 145, a threshold value U storage area 146, and the like. A width W for the mark 82 is stored in the mark width storage area 141 in advance. A coefficient A, a constant B, a constant C, a threshold value K, and a threshold value U are values that are specified in advance by operations of the external terminal 2 and are stored in storage areas of the EEPROM 14. The coefficient A, the constant B, the constant C, the threshold value K, and the threshold value U will be described in detail later.

The CPU 11 is connected to the drive circuits 16, 17, the USB controller 20, and the optical sensor 22 through the input/output I/F 15. The input/output I/F 15 transmits data and control signals. The drive circuit 16 drives the thermal head 112. The drive circuit 17 drives the tape feed motor 18. The platen roller 111 is rotated by the turning of the tape feed motor 18. The USB terminal 21, which is connected to the USB controller 20, is a device for performing communication with the external terminal 2 through the USB cable 3. The optical sensor 22 projects light onto a reverse face 81 (refer to FIG. 6) of the heat-sensitive tape 8, detects light that is reflected from the reverse face 81, and outputs a specified value.

Figure 6:
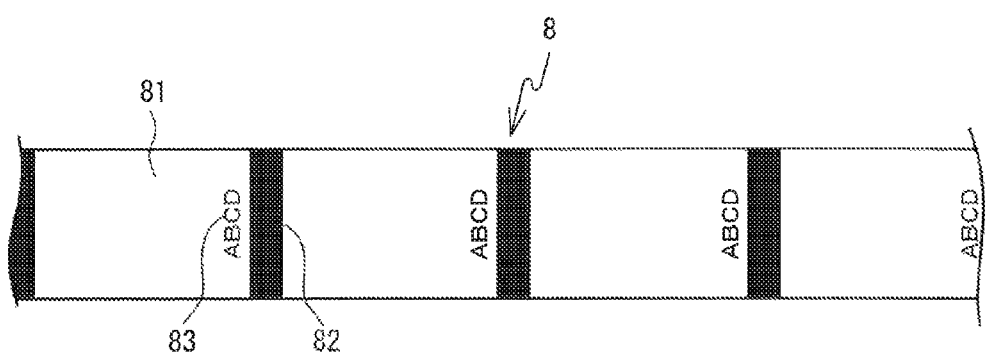
FIG. 6 is a figure of a reverse face of a heat-sensitive tape 8.

The reverse face 81 of the heat-sensitive tape 8 will be explained with reference to FIG. 6. The rectangular black mark 82, which is used for determining the printing start position, is printed on the reverse face 81 of the heat-sensitive tape 8. The mark 82 is printed over a specified distance in the transport direction of the heat-sensitive tape 8 and is printed across the entire width of the heat-sensitive tape 8 in the direction that is orthogonal to the transport direction of the heat-sensitive tape 8. On the reverse face 81 of the heat-sensitive tape 8, text characters 83 are printed in a position that is at a specified distance from the mark 82. As an example, the rectangular black mark 82 and the text characters 83 are printed on the reverse face 81 of the heat-sensitive tape 8 as shown in FIG. 6. The mark 82 is printed such that its width in the transport direction of the heat-sensitive tape 8 is greater than the size of the text characters 83. Note that symbols, graphics, or the like may also be printed instead of the text characters 83.

Figure 7:
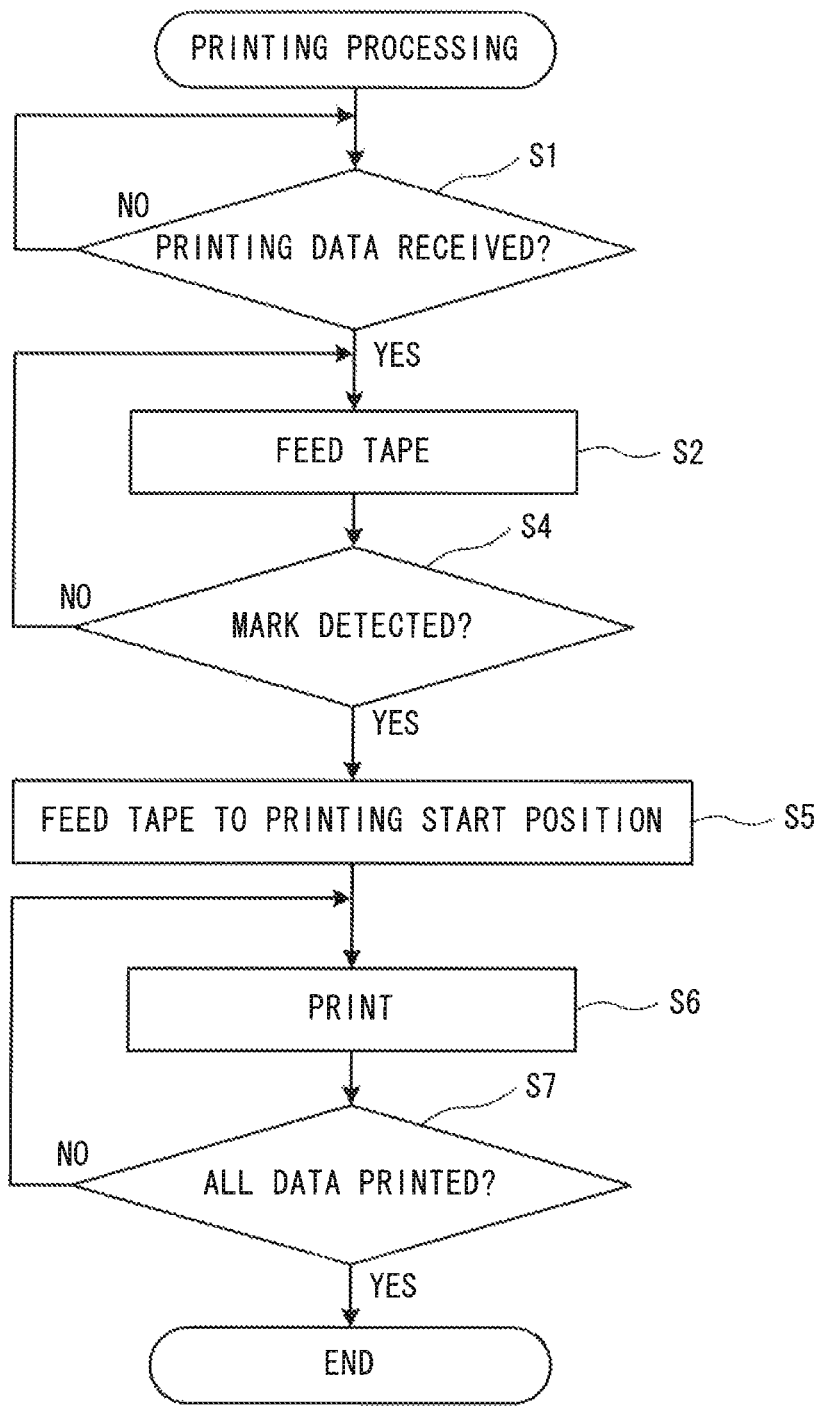
FIG. 7 is a flowchart that shows printing processing.
Figure 8:
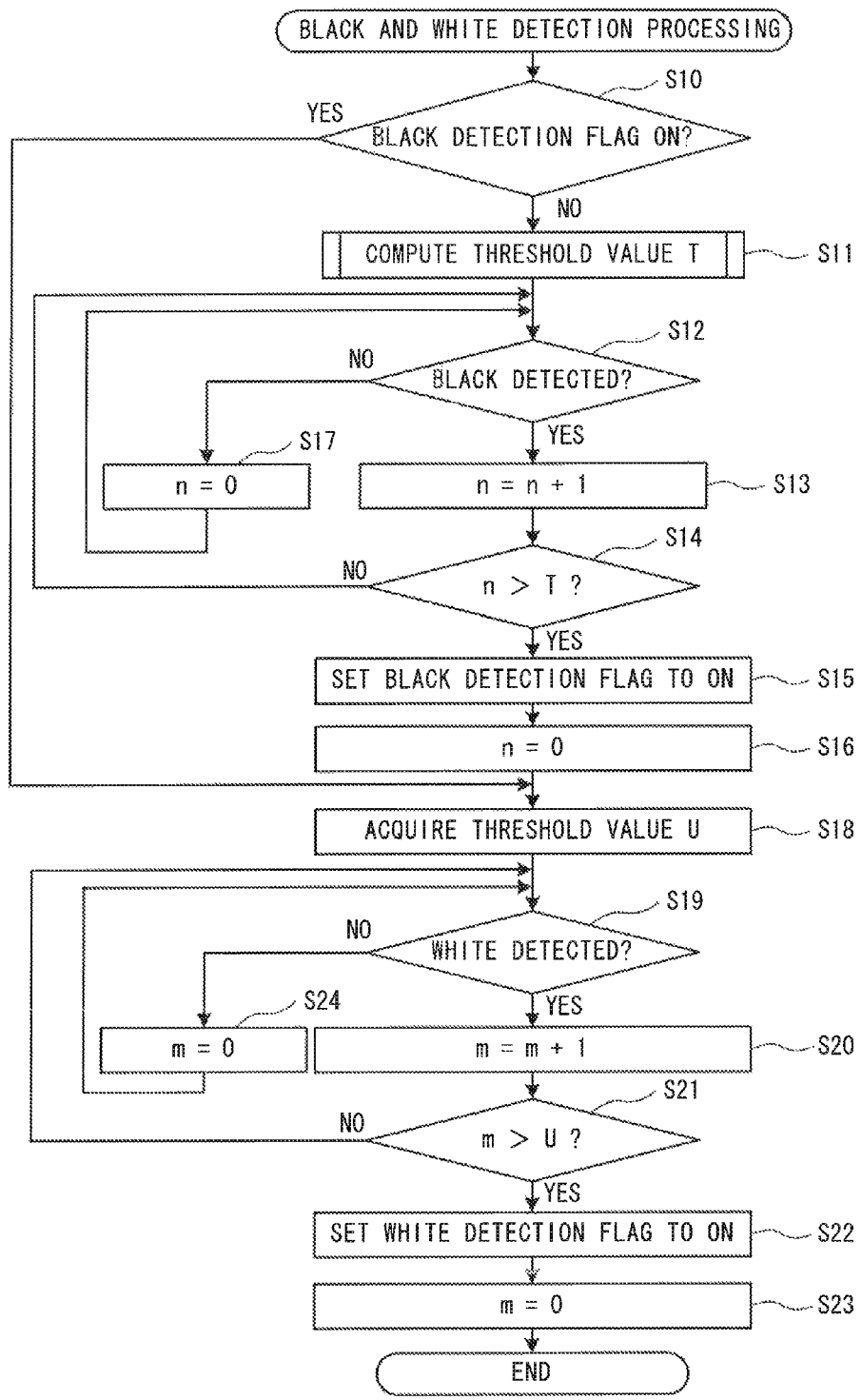
FIG. 8 is a flowchart that shows black and white detection processing.

The CPU 11 of the printer 1 in the present embodiment performs control such that the text characters 83 are not mistaken for the mark 82. This will now be explained with reference to FIGS. 7 to 10. Printing processing that is shown in FIG. 7 and black and white detection processing that is shown in FIG. 8 can be performed in parallel. The black and white detection processing that is shown in FIG. 8 is performed starting at Step S10 by interrupt processing every time the heat-sensitive tape 8 is fed one line's worth. First, the printing processing will be explained with reference to FIG. 7. When the printing data are received from the external terminal 2 (Step S1), the CPU 11 drives the tape feed motor 18 through the drive circuit 17 in order to detect the mark 82 on the reverse face 81 of the heat-sensitive tape 8 (Step S2). The platen roller 111 is rotated by the operation of the tape feed motor 18, and one line's worth of the heat-sensitive tape 8 is pulled out from the roll 9 and fed in the longitudinal direction (Step S2).

Figure 9:
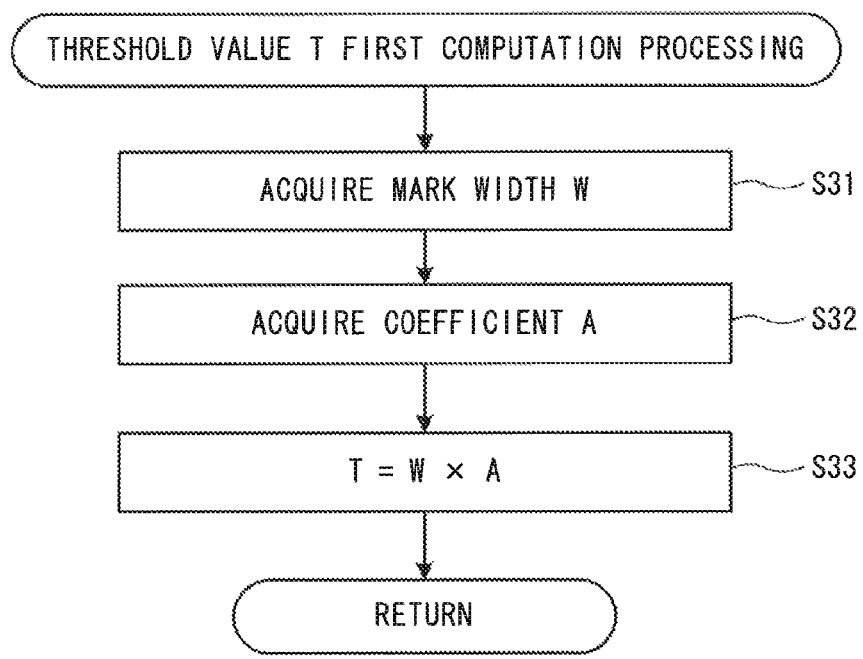
FIG. 9 is a flowchart that shows threshold value T first computation processing.
Figure 10:
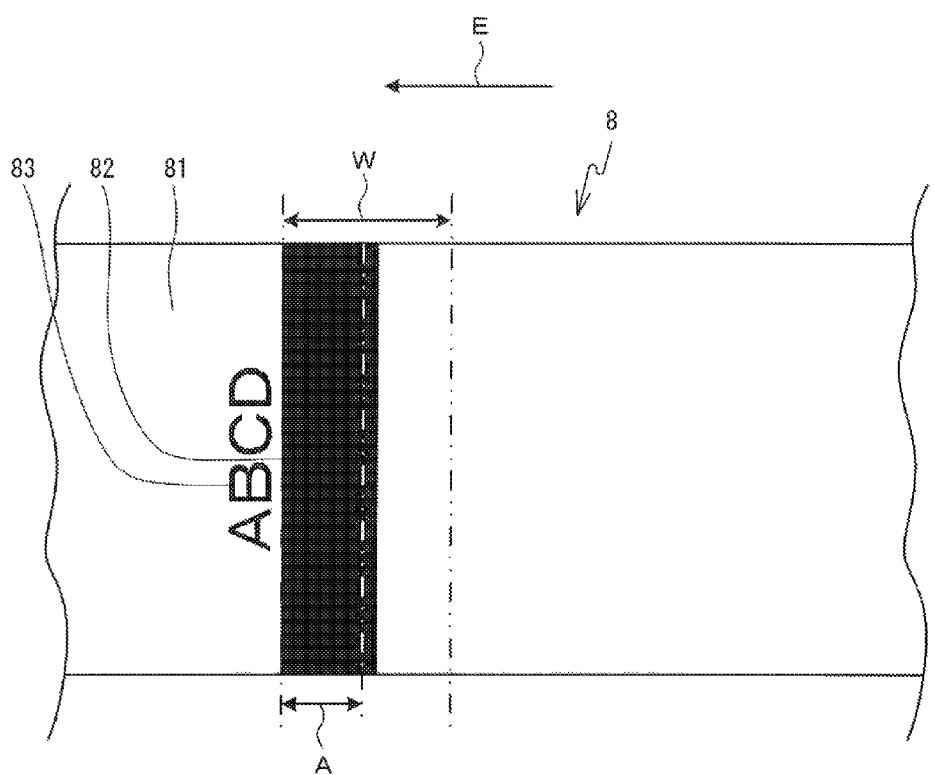
FIG. 10 is a figure of the reverse face of the heat-sensitive tape 8, illustrating a principle by which the first computation processing determines the threshold value T.

Next, the black and white detection processing is performed by interrupt processing every time the heat-sensitive tape 8 is fed one line's worth. The black and white detection processing that is performed is the black and white detection processing that is shown in FIG. 8. The black and white detection processing will be explained with reference to FIG. 8. In the black and white detection processing, first, a determination is made as to whether the black detection flag that is stored in the RAM 12 is ON (Step S10). The black detection flag is a flag that is set to ON in a case where the optical sensor 22 has detected the black of the mark 82 on the reverse face 81 of the heat-sensitive tape 8. In a case where the black detection flag is ON (YES at Step S10), the processing advances to Step S18. In a case where the black detection flag is not ON (NO at Step S10), a threshold value T for determining the detection of the black in the mark 82 is determined (Step S11). The threshold value T is a value that is used for determining the detection of the mark 82. Specifically, in a case where the number of times (the number of lines) that the optical sensor 22 consecutively detects black exceeds the threshold value T, the determination is made that the mark 82 has been detected. The processing at Step S11 is performed by a subroutine for threshold value T first computation processing that is shown in FIG. 9. In the threshold value T first computation processing that is shown in FIG. 9, first, the width W in the longitudinal direction of the heat-sensitive tape 8 (the transport direction, the direction indicated by an arrow E) is acquired for the mark 82 that is printed on the reverse face 81 of the heat-sensitive tape 8 that is shown in FIG. 10 (Step S31). The acquiring of the width W for the mark 82 is done by reading the width W for the mark 82 from the mark width storage area 141 of the EEPROM 14 (refer to FIG. 5). The width W for the mark 82 may be stored as a number of lines, for example. For example, the width W may be 20 lines or the like. In the printer 1, in a case where the printing is done at 200 dpi, for example, the distance that the platen roller 111 of the printer 1 advances for one line is 25.4 millimeters divided by 200, or 0.127 millimeters. In this case, 20 lines works out to 0.127 millimeters times 20, or 2.54 millimeters. Therefore, the width W (20 lines) of the mark 82 is equivalent to 2.54 millimeters.

Next, the coefficient A for determining the threshold value T is acquired (Step S32). The coefficient A is a value that indicates a ratio that is necessary for determining that the black portion that is the mark 82 has been detected. More specifically, the coefficient A indicates a ratio of the length of the mark 82 that is actually printed to a set length of the mark 82, as shown in FIG. 10. The coefficient A can be set as desired in the range that is greater than zero and less than 1. For example, the coefficient A may be 0.5. In the processing at Step S32, the coefficient A that has been stored in advance in the coefficient A storage area 142 of the EEPROM 14 (FIG. 5) is acquired by being read. Next, the threshold value T is computed by multiplying the width W times the coefficient A (Step S33). In the current example, the width W of 20 lines is multiplied by the coefficient A of 0.5 to compute the threshold value T as 10 lines. Then the processing returns to the black and white detection processing (FIG. 8).

Next, a determination is made as to whether the black portion that is the mark 82 was detected (Step S12). In the processing at Step S12, the detection value from the optical sensor 22 is compared to the threshold value K. In a case where the detection value from the optical sensor 22 is less than the threshold value K, the CPU 11 determines that black was detected (YES at Step S12). The optical sensor 22 is a reflecting-type optical sensor, and black reflects less light than white does. The threshold value K is a value that is used for determining whether the detection value from the optical sensor 22 that detects the reflected light is a value that corresponds to black or a value that corresponds to white. The threshold value K is set in accordance with the properties of the optical sensor 22, and it is stored in advance in the threshold value K storage area 145 of the EEPROM 14 (FIG. 5). When black is detected (YES at Step S12), a counter n is set to n+1, that is, is incremented by 1 (Step S13). The counter n counts the number of times (the number of lines) that the optical sensor 22 has detected black. Next, a determination is made as to whether the counter n is greater than the threshold value T (Step S14). In a case where the counter n is greater than the threshold value T (n>T) (YES at Step S14), the detected black is deemed to be the black portion that is the mark 82, and the black detection flag is set to "1" (ON) and is stored in the RAM 12 (Step S15). Next, the counter n is reset to zero (Step S16). Note that in a case where black is not detected at Step S12 (NO at Step S12), the counter n is reset to zero (Step S17), and the processing returns to Step S12. The processing also returns to Step S12 in a case where the counter n at Step S14 is not greater than the threshold value T (n≤T) (NO at Step S14). When the processing at Steps S11 to S16 is completed, the processing advances to white detection processing that is shown at Steps S18 to S24.

In the white detection processing, first, the threshold value U is acquired for determining the detection of the white portion of the heat-sensitive tape 8, not the mark 82 (Step S18). In the processing at Step S18, the threshold value U that has been stored in advance in the threshold value U storage area 146 of the EEPROM 14 (FIG. 5) is acquired by being read. The threshold value U is a value that is used, in a case where the optical sensor 22 has detected the white portion, for determining that the detected white portion is not the mark 82. Specifically, in a case where the number of times (the number of lines) that the optical sensor 22 detects the white portion exceeds the threshold value U, the determination is made that the white portion, and not the mark 82, has been detected. The threshold value U can be set in advance as desired. The threshold value U is set such that the threshold value T will be greater than the threshold value U. For example, the threshold value U may be 1. The reason for setting the threshold value U to 1 is to make it possible to determine that the detection by the optical sensor 22 has reached the trailing edge of the mark 82 in a case where the optical sensor 22 detects white one time after the black portion that is the mark 82 has been detected. The reason for setting the threshold value U to less than the threshold value T is to make it possible to distinguish the text characters 83 from the mark 82 in a case where black has been detected consecutively for at least a specified number of lines.

Next, a determination is made as to whether the optical sensor 22 has detected the white portion (Step S19). In the processing at Step S19, the detection value from the optical sensor 22 is compared to the threshold value K. In a case where the detection value from the optical sensor 22 is not less than the threshold value K, the CPU 11 determines that white was detected (YES at Step S19). The optical sensor 22 is a reflecting-type optical sensor, and white reflects more light than black does. When white is detected (YES at Step S19), a counter m is set to m+1, that is, is incremented by 1 (Step S20). The counter m counts the number of times (the number of lines) that the optical sensor 22 has detected white. Next, a determination is made as to whether the counter m is greater than the threshold value U (Step S21). In a case where the counter m is greater than the threshold value U (m>U) (YES at Step S21), the processing deems the detected white to be the white portion, and not the mark 82, and a white detection flag is set to "1" (ON) and is stored in the RAM 12 (Step S22). Next, the counter m is reset to zero (Step S23). Note that in a case where white is not detected at Step S19 (NO at Step S19), the counter m is reset to zero (Step S24), and the processing returns to Step S19. The processing also returns to Step S19 in a case where the counter m at Step S21 is not greater than the threshold value U (m≤U) (NO at Step S21). The processing at Steps S10 to S23 is performed as interrupt processing starting at Step S10 every time the heat-sensitive tape 8 is fed one line's worth (Step S2), so every time the heat-sensitive tape 8 is fed one line's worth, the processing is performed starting at Step S10, even if that causes the preceding round of the processing to be stopped before it is completed.

In the printing processing, every time the heat-sensitive tape 8 is fed one line's worth (Step S2), a determination is made as to whether the mark 82 has been detected (Step S4). In the mark detection processing (Step S4), a determination is made that the mark 82 has been detected (YES at Step S4) in a case where both the black detection flag and white detection flag that are stored in the RAM 12 are set to "1" (ON). The result that the mark 82 on the reverse face 81 of the heat-sensitive tape 8 that is being fed has been detected by the optical sensor 22 means that black was continuously detected over a fixed distance in the transport direction (the longitudinal direction) of the heat-sensitive tape 8, and that white was detected thereafter. Therefore, both the black detection flag and white detection flag are set to "1" (ON), the CPU 11 is able to determine that mark 82 has been detected.

In a case where it has been determined at Step S4 that the mark 82 has been detected (YES at Step S4), the CPU 11 feeds the heat-sensitive tape 8 by a specified amount to the printing start position, using the detected position of the mark 82 as a reference (Step S5). Specifically, the CPU 11 rotates the platen roller 111 by operating the tape feed motor 18 through the drive circuit 17, thus feeding the heat-sensitive tape 8 to the printing start position, using the detected position of the mark 82 as a reference (Step S5).

Next, based on the printing data that were received at Step S1, the CPU 11 uses the thermal head 112 to perform printing on the surface of the heat-sensitive tape 8, one line at a time in succession (Step S6). In a case where the printing has been completed for all of the printing data that were received at Step S1 (YES at Step S7), the black detection flag and the white detection flag are reset to "0", and the printing processing is terminated.

As described above, in the printer 1 in the present embodiment, the determination that the mark 82 has been detected can be made in a case where the optical sensor 22 has detected white after detecting black consecutively for a number of lines that is not less than the threshold value T, which is a fixed ratio (the coefficient A) of the width W for the mark 82. In a case where the optical sensor 22 has detected the text characters 83, which have a width that is not greater than the width W for the mark 82, the optical sensor 22 detects white prior to detecting black consecutively for a number of lines that is not less than the threshold value T. Therefore, it is possible to prevent the text characters 83 from being mistakenly detected as the mark 82. The threshold value T is computed by multiplying the width W times the coefficient A. Here, the coefficient A is set such that the threshold value T will be not less than the size of the text characters 83 in the transport direction of the heat-sensitive tape 8. It is therefore possible to derive the appropriate threshold value T easily just by setting the coefficient A in advance in accordance with the size of the text characters 83 and the width W for the mark 82. In the threshold value T computation processing (Step S11), the reason for multiplying the width W for the mark 82 by the specified coefficient A is because it is assumed that there are cases in which the actual width of the mark 82 that is printed on the reverse face 81 of the heat-sensitive tape 8 will be narrower than the width W that is set, due to errors.

Figure 11:
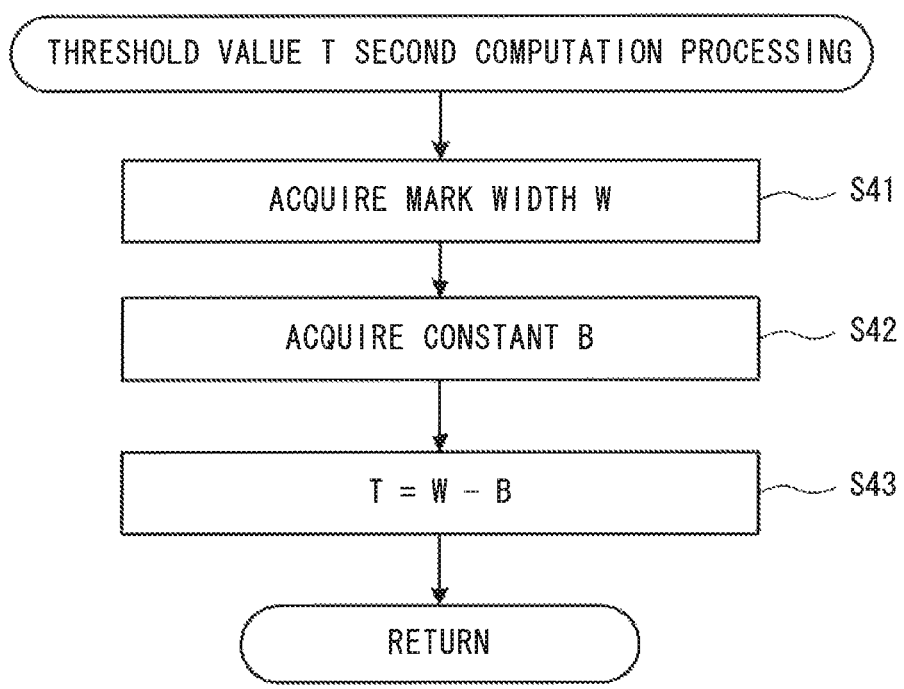
FIG. 11 is a flowchart that shows threshold value T second computation processing.
Figure 12:
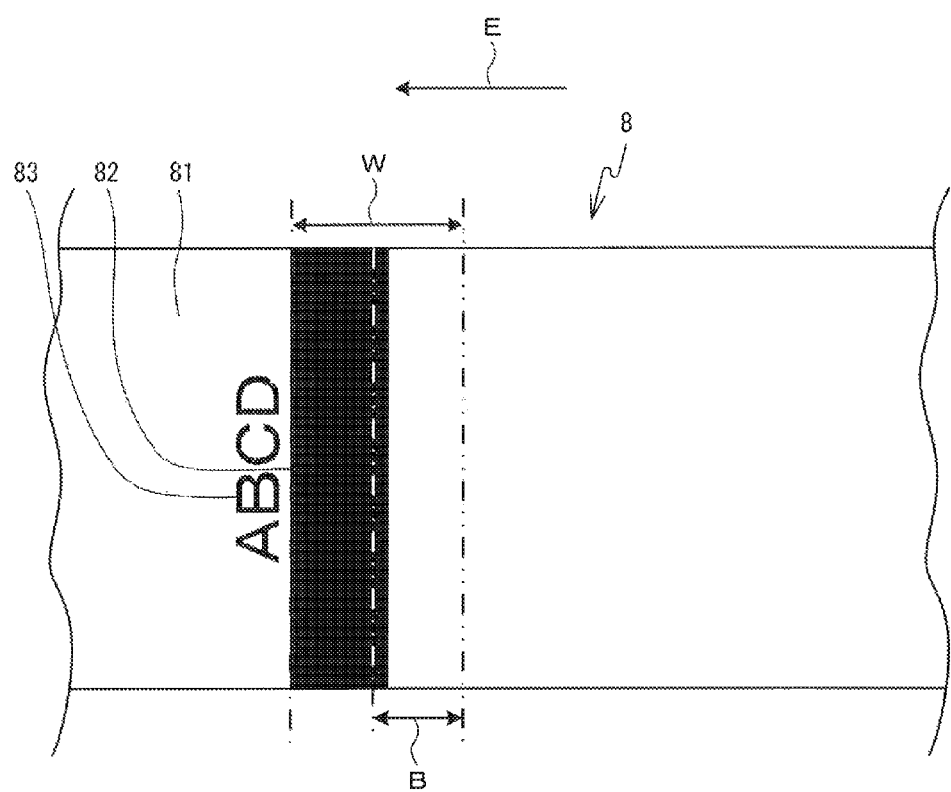
FIG. 12 is a figure of the reverse face of the heat-sensitive tape 8, illustrating a principle by which the second computation processing determines the threshold value T.

Next, threshold value T second computation processing that is a second embodiment of the threshold value T computation processing that is shown in FIG. 8 will be explained with reference to FIGS. 11 and 12. The processing at Step S11 is performed by a subroutine for the threshold value T second computation processing that is shown in FIG. 11. In the threshold value T second computation processing that is shown in FIG. 11, first, the width W in the longitudinal direction of the heat-sensitive tape 8 (the transport direction, the direction indicated by an arrow E) is acquired for the mark 82 that is printed on the reverse face 81 of the heat-sensitive tape 8 that is shown in FIG. 12 (Step S41). The acquiring of the width W for the mark 82 is done by reading the width W for the mark 82 from the mark width storage area 141 of the EEPROM 14 (FIG. 5). The width W for the mark 82 may be stored as a number of lines, for example. For example, the width W may be 20 lines or the like.

Next, the constant B for determining the threshold value T is acquired (Step S42). As shown in FIG. 12, the constant B is a value (for example, a number of lines) that indicates a length that is subtracted from the length (for example, the number of lines) of the actually printed mark 82. The constant B can be set as desired in the range that is less than the width W. For example, if the width W is 20 lines, the constant B may be 12 lines. In the processing at Step S42, the constant B that has been stored in advance in the constant B storage area 143 of the EEPROM 14 (FIG. 5) is acquired by being read. Next, the threshold value T is computed by subtracting the constant B from the width W (Step S43). In the current example, 12 is subtracted from the width W of 20 lines to compute the threshold value T as 8 lines. Then the processing returns to the black and white detection processing (FIG. 8). The subsequent processing is the same as in the previously described embodiment.

As described above, in the printer 1 that uses the second computation processing for computing the threshold value T, the determination that the mark 82 has been detected can be made in a case where the optical sensor 22 has detected white after detecting black consecutively for a number of lines that is not less than the threshold value T, which is computed by subtracting a fixed width (the constant B) from the width W for the mark 82. In a case where the optical sensor 22 has detected the text characters 83, which have a width that is less than the difference between the fixed width (the constant B) and the width W for the mark 82, the optical sensor 22 detects white prior to detecting black consecutively for a number of lines that is not less than the threshold value T. Therefore, it is possible to prevent the text characters 83 from being mistakenly detected as the mark 82. The threshold value T is computed by subtracting the constant B from the width W. Here, the constant B is set such that the threshold value T will be not less than the size of the text characters 83 in the transport direction of the heat-sensitive tape 8. It is therefore possible to derive the appropriate threshold value T easily just by setting the constant B in advance in accordance with the size of the text characters 83 and the width W for the mark 82. In the threshold value T computation processing (Step S11), the reason for subtracting the constant B, which is a fixed length, from the width W for the mark 82 is because it is assumed that there are cases in which the actual width of the mark 82 that is printed on the reverse face 81 of the heat-sensitive tape 8 will be narrower than the width W that is set, due to errors.

Figure 13:
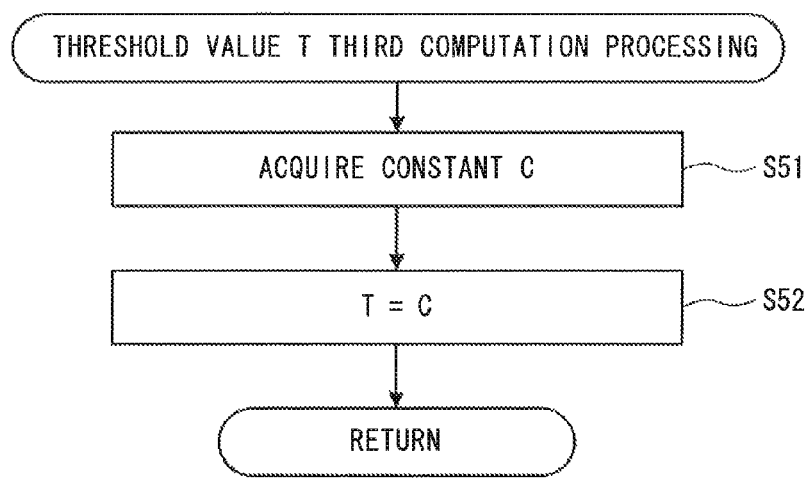
FIG. 13 is a flowchart that shows threshold value T third computation processing.
Figure 14:
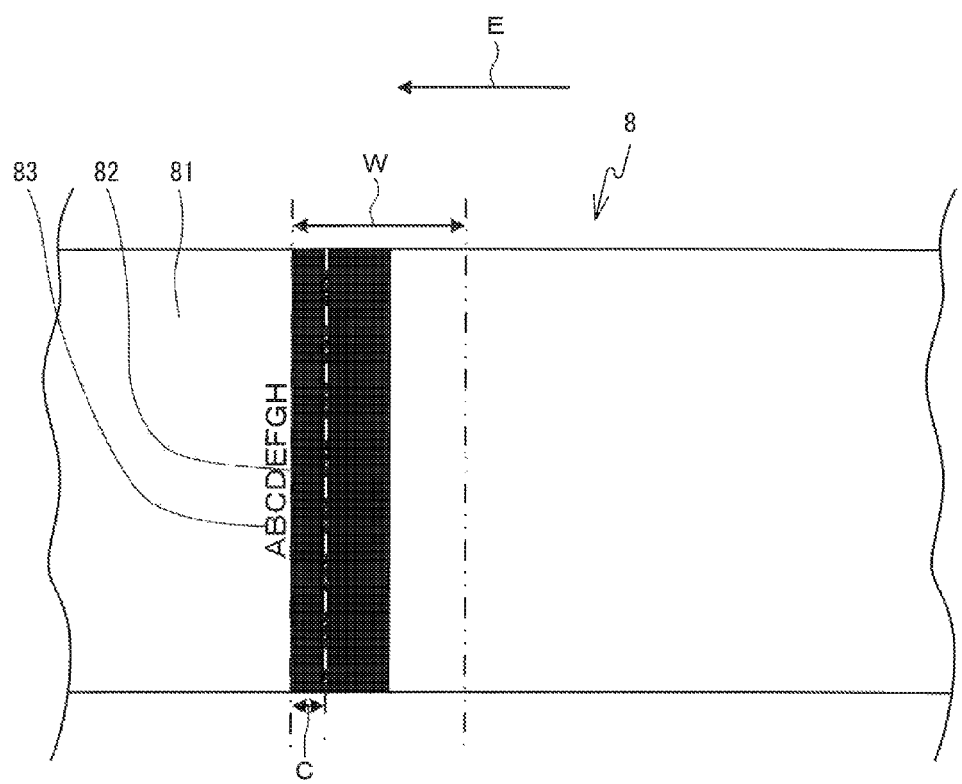
FIG. 14 is a figure of the reverse face of the heat-sensitive tape 8, illustrating a principle by which the third computation processing determines the threshold value T.

Next, threshold value T third computation processing that is a third embodiment of the threshold value T computation processing that is shown in FIG. 8 will be explained with reference to FIGS. 13 and 14. The processing at Step S11 is performed by a subroutine for the threshold value T third computation processing that is shown in FIG. 13. In the threshold value T third computation processing that is shown in FIG. 13, first, the constant C, which is a fixed value that indicates the length of a portion of the width W in the longitudinal direction of the heat-sensitive tape 8 (the transport direction, the direction indicated by an arrow E), is acquired for the mark 82 that is printed on the reverse face 81 of the heat-sensitive tape 8 that is shown in FIG. 14 (Step S51). As shown in FIG. 14, the constant C is the length (for example, the number of lines) of a portion of the actual length (for example, the number of lines) of the mark 82. The constant C can be set as desired in the range that is less than the width W. For example, if the width W is 20 lines, the constant C may be 7 lines. In the processing at Step S51, the constant C that has been stored in advance in the constant C storage area 144 of the EEPROM 14 (FIG. 5) is acquired by being read. Next, the threshold value T is set to the constant C (Step S52). Then the processing returns to the black and white detection processing (FIG. 8). The subsequent processing is the same as in the previously described embodiment.

As described above, in the printer 1 that uses the third computation processing for computing the threshold value T, the determination that the mark 82 has been detected can be made in a case where the optical sensor 22 has detected white after detecting black consecutively for a number of lines that is not less than the threshold value T, which is set to the constant C, a fixed value. Because the constant C is used as the threshold value T, it is possible to derive the appropriate threshold value T easily, without computation, just by setting the constant C in advance in accordance with the size of the text characters 83 and the width W for the mark 82.

Figure 15:
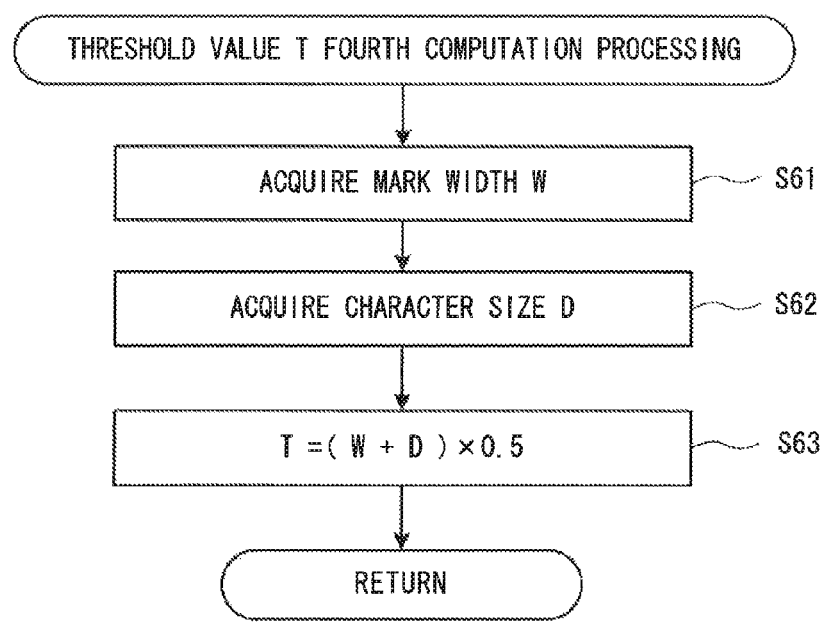
FIG. 15 is a flowchart that shows threshold value T fourth computation processing.

Next, threshold value T fourth computation processing that is a fourth embodiment of the threshold value T computation processing that is shown in FIG. 8 will be explained with reference to FIGS. 15 and 16. The processing at Step S11 is performed by a subroutine for the threshold value T fourth computation processing that is shown in FIG. 15. In the threshold value T fourth computation processing that is shown in FIG. 15, first, the width W in the longitudinal direction of the heat-sensitive tape 8 (the transport direction, the direction indicated by an arrow E) is acquired for the mark 82 that is printed on the reverse face 81 of the heat-sensitive tape 8 that is shown in FIG. 16 (Step S61). The acquiring of the width W for the mark 82 is done by reading the width W for the mark 82 from the mark width storage area 141 of the EEPROM 14 (FIG. 5). Next, a text character size D of the text characters 83 in the longitudinal direction (the transport direction) of the heat-sensitive tape 8 is acquired (Step S62). The text character size D is acquired from data that indicate the size of the text characters that are contained in the printing data that the printer 1 has received from the external terminal 2. For example, the text character size D may be expressed as a number of lines in the auxiliary scanning direction in the longitudinal direction (the transport direction) of the heat-sensitive tape 8. Next, the threshold value T is computed by adding the text character size D to the width W and multiplying the sum by 0.5 (Step S63). For example, the text character size D of 10 lines is added to the width W of 20 lines, and the sum 30 is multiplied by 0.5 to compute the threshold value T as 15 lines. In a case where the threshold value T is based on this formula, the threshold value T is a numerical value that lies between the width W for the mark 82 and the size D for the text characters 83. Thereafter, the processing returns to the black and white detection processing that is shown in FIG. 8.

As described above, in the printer 1 that uses the fourth computation processing for computing the threshold value T, the determination that the mark 82 has been detected can be made in a case where the optical sensor 22 has detected white after detecting black consecutively for a number of lines that is not less than the threshold value T, which is a value that is computed by multiplying the sum of the width W for the mark 82 and the size D for the text characters 83 by a fixed coefficient (for example, 0.5). In this case, it is possible to derive the appropriate threshold value T easily if the width W for the mark 82 and the size D for the text characters 83 are known.

Note that the present disclosure is not limited to the embodiments that have been described above, and various types of modifications can be made. For example, the specific examples of the coefficient A, the constant B, and the constant C are only examples and are not necessarily limited to those specific numerical values. The value of 0.5 at Step S63 in FIG. 15 is also not necessarily limited to that value, and it can be modified as desired. The heat-sensitive tape 8 may also have an adhesive layer and a release paper on its reverse face side, and the mark 82 and the text characters 83 may also be printed on the release paper. Furthermore, the color of the mark 82 (the first detection object color) is not necessarily limited to being black, and any desired color, such as blue, red, gray, or the like, can be used, as long as the optical sensor 22 can detect it. The second detection object color is the color of the reverse face 81 of the heat-sensitive tape 8, but it is not limited to being white, and any desired color, such as beige, cream, or the like, can be used, as long as it can be distinguished from the first detection object color.

What is claimed is:

1. A printer, comprising:
 a printing device that prints on a surface of a printing medium;
 a transport device that transports the printing medium;
 a control portion that controls the transporting of the printing medium by the transport device and the printing by the printing device, based on detection of a mark that is printed in advance on a reverse face of the printing medium;
 an optical sensor that outputs a specified output value, based on light that is reflected from the reverse face of the printing medium;
 a width information storage portion that stores width information that indicates a width of the mark in the transport direction of the printing medium;
 a threshold value setting portion that sets a first threshold value for making a determination, based on the width information that is stored in the width information storage portion, as to whether the mark has been detected;
 a first determination portion that determines whether a first detection object color has been detected, based on the output value from the optical sensor;
 a first declaration portion that, in a case where the number of times that the first determination portion has consecutively determined that the first detection object color has been detected is not less than the first threshold value, declares that the first detection object color is continuous over a specified width in the transport direction of the printing medium;
 a second determination portion that determines whether a second detection object color that is different from the first detection object color has been detected, based on the output value from the optical sensor; and
 a second declaration portion that declares that the mark has been detected in a case where, after the first declaration portion has declared that the first detection object color is continuous over the specified width in the transport direction of the printing medium, the number of times that the second determination portion has consecutively determined that the second detection object color has been detected is not less than a specified second threshold value.

2. The printer according to claim 1, wherein
 the width information is a numerical value that indicates the width of the mark, and
 the threshold value setting portion sets the first threshold value by multiplying a specified ratio times the numerical value that is the width information that is stored in the width information storage portion.

3. The printer according to claim 1, wherein
 the width information is a numerical value that indicates the width of the mark, and
 the threshold value setting portion sets the first threshold value by subtracting a specified value from the numerical value that is the width information that is stored in the width information storage portion.

4. The printer according to claim 1, wherein
 the threshold value setting portion sets a specified characteristic value as the first threshold value.

5. The printer according to claim 1, wherein
 the threshold value setting portion sets the first threshold value based on the width information that is stored in the width information storage portion and on information on the size of a character that is printed in advance on the reverse face of the printing medium.

6. The printer according to claim 5, wherein
the width information is a numerical value that indicates the width of the mark,
the information on the size of the character is a numerical value that indicates the size of the character, and
the threshold value setting portion sets the first threshold value such that the first threshold value is a numerical value that is between the numerical value that is the width information and the numerical value that is the information on the size of the character.

7. The printer according to claim 1, wherein
the first threshold value is greater than the second threshold value.

8. A non-transitory computer-readable medium storing computer-readable instructions that instruct a printer that is provided with a printing device that prints on a printing medium, a transport device that transports the printing medium, and an optical sensor that outputs a specified output value based on reflected light to execute steps comprising:
  storing width information that indicates a width in the transport direction of the printing medium of a mark that is printed in advance on a reverse face of the printing medium;
  setting a first threshold value for making a determination, based on the stored width information, as to whether the mark has been detected;
  determining whether a first detection object color has been detected, based on the output value from the optical sensor, which is based on light that is reflected from the reverse face of the printing medium;
  declaring, in a case where the number of times that it has been consecutively determined that the first detection object color has been detected is not less than the first threshold value, that the first detection object color is continuous over a specified width in the transport direction of the printing medium;
  determining whether a second detection object color that is different from the first detection object color has been detected, based on the output value from the optical sensor;
  declaring that the mark has been detected in a case where, after it has been declared that the first detection object color is continuous over the specified width in the transport direction of the printing medium, the number of times that it has been consecutively determined that the second detection object color has been detected is not less than a specified second threshold value; and
  controlling the transport device and the printing device, based on the detection of the mark.

9. The non-transitory computer-readable medium according to claim 8, wherein
the width information is a numerical value that indicates the width of the mark, and
the first threshold value is set by multiplying a specified ratio times the numerical value that is the stored width information.

10. The non-transitory computer-readable medium according to claim 8, wherein
the width information is a numerical value that indicates the width of the mark, and
the first threshold value is set by subtracting a specified value from the numerical value that is the stored width information.

11. The non-transitory computer-readable medium according to claim 8, wherein
a specified characteristic value is set as the first threshold value.

12. The non-transitory computer-readable medium according to claim 8, wherein
the first threshold value is set based on the stored width information and on information on the size of a character that is printed in advance on the reverse face of the printing medium.

13. The non-transitory computer-readable medium according to claim 12, wherein
the width information is a numerical value that indicates the width of the mark,
the information on the size of the character is a numerical value that indicates the size of the character, and
the first threshold value is set such that the first threshold value is a numerical value that is between the numerical value that is the width information and the numerical value that is the information on the size of the character.

14. The non-transitory computer-readable medium according to claim 8, wherein
the first threshold value is greater than the second threshold value.

* * * * *